(12) United States Patent
Gnüchtel et al.

(10) Patent No.: US 9,358,701 B2
(45) Date of Patent: Jun. 7, 2016

(54) METHOD FOR THE LAYERWISE CONSTRUCTION OF MODELS

(75) Inventors: Ingo Gnüchtel, Merching (DE); Daniel Günther, München (DE); Ingo Ederer, Geltendorf (DE); Christian Lustig, Hannover (DE); Edgar Müller, Langenhagen (DE)

(73) Assignee: VOXELJET AG, Friedberg (DE)

( * ) Notice: Subject to any disclaimer, the term of this patent is extended or adjusted under 35 U.S.C. 154(b) by 221 days.

(21) Appl. No.: 14/126,933

(22) PCT Filed: Jun. 20, 2012

(86) PCT No.: PCT/DE2012/000646
§ 371 (c)(1),
(2), (4) Date: Feb. 4, 2014

(87) PCT Pub. No.: WO2012/175072
PCT Pub. Date: Dec. 27, 2012

(65) Prior Publication Data
US 2014/0212677 A1    Jul. 31, 2014

(30) Foreign Application Priority Data
Jun. 22, 2011    (DE) .................. 10 2011 105 688

(51) Int. Cl.
| | |
|---|---|
| B28B 1/00 | (2006.01) |
| B29C 67/00 | (2006.01) |
| C04B 28/26 | (2006.01) |
| B28B 7/46 | (2006.01) |
| B22C 1/18 | (2006.01) |
| B22C 9/10 | (2006.01) |
| B22C 23/00 | (2006.01) |
| C04B 111/00 | (2006.01) |

(52) U.S. Cl.
CPC . B28B 1/001 (2013.01); B22C 1/18 (2013.01); B22C 1/188 (2013.01); B22C 9/10 (2013.01); B22C 23/00 (2013.01); B28B 7/465 (2013.01); C04B 28/26 (2013.01); C04B 2111/00181 (2013.01); C04B 2111/00215 (2013.01); Y02P 10/292 (2015.11); Y02W 30/94 (2015.05)

(58) Field of Classification Search
None
See application file for complete search history.

(56) References Cited

U.S. PATENT DOCUMENTS

| | | | | |
|---|---|---|---|---|
| 4,030,939 | A | * | 6/1977 | Mallow ................. C04B 28/008 106/624 |
| 5,204,055 | A | * | 4/1993 | Sachs ..................... B05C 19/04 264/113 |
| 5,902,441 | A | * | 5/1999 | Bredt ........................ B28B 1/00 156/284 |
| 6,259,962 | B1 | | 7/2001 | Gothait |
| 8,741,194 | B1 | | 6/2014 | Ederer et al. |
| 2004/0026418 | A1 | | 2/2004 | Ederer et al. |
| 2004/0035542 | A1 | | 2/2004 | Ederer et al. |
| 2004/0138336 | A1 | * | 7/2004 | Bredt ........................ B28B 1/00 523/160 |
| 2004/0170765 | A1 | | 9/2004 | Ederer et al. |
| 2005/0017394 | A1 | | 1/2005 | Hochsmann et al. |
| 2005/0167872 | A1 | | 8/2005 | Tsubaki et al. |
| 2005/0212163 | A1 | * | 9/2005 | Bausinger ................ B28B 1/00 264/113 |
| 2006/0105102 | A1 | | 5/2006 | Hochsmann et al. |
| 2006/0108090 | A1 | | 5/2006 | Ederer et al. |
| 2006/0175346 | A1 | | 8/2006 | Ederer et al. |
| 2006/0237159 | A1 | | 10/2006 | Hochsmann |
| 2006/0254467 | A1 | * | 11/2006 | Farr ........................ B28B 1/00 106/728 |
| 2006/0257579 | A1 | * | 11/2006 | Farr ........................ B28B 1/00 427/402 |
| 2008/0001331 | A1 | | 1/2008 | Ederer |
| 2008/0233302 | A1 | | 9/2008 | Elsner |
| 2008/0237933 | A1 | | 10/2008 | Hochsmann et al. |
| 2008/0260945 | A1 | | 10/2008 | Ederer et al. |
| 2009/0261497 | A1 | | 10/2009 | Ederer et al. |
| 2010/0212584 | A1 | | 8/2010 | Ederer et al. |
| 2010/0243123 | A1 | | 9/2010 | Ederer et al. |
| 2010/0244301 | A1 | | 9/2010 | Ederer et al. |
| 2010/0272519 | A1 | | 10/2010 | Ederer et al. |
| 2010/0291314 | A1 | | 11/2010 | Kashani-Shirazi |
| 2011/0177188 | A1 | * | 7/2011 | Bredt ...................... B22C 1/181 425/175 |
| 2011/0223437 | A1 | | 9/2011 | Ederer et al. |
| 2011/0308755 | A1 | | 12/2011 | Hochsmann |
| 2012/0094026 | A1 | | 4/2012 | Ederer et al. |
| 2012/0097258 | A1 | | 4/2012 | Hartmann |
| 2012/0113439 | A1 | | 5/2012 | Ederer |
| 2012/0291701 | A1 | | 11/2012 | Grasegger et al. |
| 2013/0000549 | A1 | | 1/2013 | Hartmann et al. |
| 2013/0004610 | A1 | | 1/2013 | Hartmann et al. |
| 2013/0026680 | A1 | | 1/2013 | Ederer et al. |
| 2013/0029001 | A1 | | 1/2013 | Gunther et al. |
| 2013/0092082 | A1 | | 4/2013 | Ederer et al. |
| 2013/0199444 | A1 | | 8/2013 | Hartmann |
| 2013/0234355 | A1 | | 9/2013 | Hartmann et al. |
| 2013/0302575 | A1 | | 11/2013 | Mogele et al. |
| 2013/0313757 | A1 | | 11/2013 | Kashani-Shirazi |

(Continued)

FOREIGN PATENT DOCUMENTS

| | | |
|---|---|---|
| DE | 102004014806 B4 | 9/2006 |
| EP | 0431924 A3 | 6/1991 |

(Continued)

OTHER PUBLICATIONS

International Search Report, Application No. PCT/DE2012/000646, dated Oct. 5, 2012.

(Continued)

*Primary Examiner* — Mary F Theisen
(74) *Attorney, Agent, or Firm* — The Dobrusin Law Firm, P.C.

(57) ABSTRACT

A method is described here for the layerwise construction of models, wherein, in a building region, a particulate material is applied layerwise and selectively cured. These steps are repeated until a desired model is obtained. The material comprises in this case a particulate building material and a spray-dried alkali metal silicate solution. Selective activation of the curing proceeds using a water-comprising solution.

20 Claims, No Drawings

(56) References Cited

U.S. PATENT DOCUMENTS

| | | |
|---|---|---|
| 2014/0202381 A1 | 7/2014 | Ederer et al. |
| 2014/0212677 A1 | 7/2014 | Gnuchtel et al. |
| 2014/0227123 A1 | 8/2014 | Gunster |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |

FOREIGN PATENT DOCUMENTS

| | | |
|---|---|---|
| EP | 1510310 A3 | 3/2005 |
| EP | 1721875 A2 | 11/2006 |
| EP | 2163328 A1 | 3/2010 |
| WO | 98/09798 | 3/1998 |
| WO | 01/68375 A2 | 9/2001 |
| WO | 2011/087564 A1 | 7/2011 |

OTHER PUBLICATIONS

International Preliminary Report on Patentability, Application No. PCT/DE2012/000646, dated Dec. 23, 2013.

Translation of Written Opinion of the International Search Authority, Application No. PCT/DE2012/000646, dated Oct. 5, 2010.

* cited by examiner

METHOD FOR THE LAYERWISE CONSTRUCTION OF MODELS

CLAIM OF PRIORITY

This application is a national phase filing under 35 USC §371 from PCT Application serial number PCT/DE2012/000646 filed on Jun. 20, 2012, and claims priority therefrom. This application further claims priority from German Patent Application Number DE 10 2011 105 688.6 filed on Jun. 22, 2011, incorporated herein by reference.

The invention relates to a method for building models in layers as well as to material systems for the layerwise construction of models.

Generative methods for producing 3D structures have long been known (for example, from EP 0 431 924 B1 or WO200168375A2).

This includes, among other things, stereo lithographic methods (solidification of monomeric liquids using a high energy beam), selective laser sintering (melting particulate material using a high energy beam) and 3D printing. All aforementioned methods permit the comparatively economical manufacture of molds for building prototypes. When printing devices are equipped with multiple controllable nozzles, 3D printing permits building speeds that are superior to all other methods. Its application is therefore not limited to prototypes. Even series-produced components may be produced economically.

In principle, different methods may be derived from the prior art: systems that are entirely liquid-based and systems that use powder materials, which are selectively solidified by the introduction of liquid or energy input.

The first of these systems, which are entirely liquid-based, are known, for example, from U.S. Pat. No. 6,259,962 of Objet Geometries Ltd. This method is based on the fact that two different materials are generated during solidification. The model produced in layers may then be removed from the support material after the printing process with the aid of a dissolving method for example, a water bath.

Solidification of the materials, which were initially fluid for printing, may take place, for example, using UV radiation. In addition, two-component or multicomponent systems may be used, which are brought together and solidified on the building platform. However, since the complete building volume must be generated with the aid of ink-jet printers, this method is comparatively slow and therefore suitable only for small components.

The methods for building models in layers which use particulate material are a much more economical alternative, in particular with regard to time intensity. In these methods, a powdered material is selectively bonded. The particulate material is applied in thin layers and smoothed on a workpiece platform, for example, using a coater. A print head solidifies selective areas on the powder layer on the basis of component data stored in the computer. This process is repeated until the component is finished and may be removed from the unbound particulate material.

One advantage of this approach is that part of the component mater already provided by the volume of the particulate material. The amount that must be dispensed in liquid form by a printer is therefore comparatively small. As a result, this method permits high print head speeds, short layering times and a—comparatively—simple print head structure.

In this case, the particulate material is solidified by the bonding of individual particles to each other.

Since the middle of the last century, inorganic binder systems have been used in the metal casting sector to produce sand molds.

Examples of such so-called hydraulic binders to be mentioned here are binders that cure both in air as well as underwater.

These include, for example, gypsum-based molding materials. For example, a gypsum-containing particulate material may be used to manufacture casting molds. The gypsum plaster contained in the particulate material is activated with an aqueous solution and cured, for example, selectively. The mold must be dried after printing.

After production, the gypsum plaster contains a lot of "free water", which can cause problems during casting since it is able to evaporate instantly upon heating.

Furthermore, it has been shown that the solidity of the gypsum plaster is not particularly high and the temperature resistance of the gypsum plaster only permits a light metal casting for the resulting molds. Moreover, it has been shown that the gypsum plaster in the cured state is very dense, thereby impeding permeability of gases that may arise during casting so that such gases can penetrate into the molten mass.

In addition, cement-bonded molding materials are known, examples of such can be referred to in DE 10 2004 014 806 B4, EP 1 510 310 A2.

In this process, cement is located in the sand for the mold and the cement is activated by an aqueous ink.

A disadvantage of such has been exhibited in that cements generally develop higher solidities during tempering, which they then retain even after subsequent cooling. This means that the cast part is difficult to remove from the molding material after casting.

In addition, excess water here can also lead to problems during casting. Therefore the mold has to be dried before casting.

Furthermore, it may also be that the particle size distribution of reactive cements poses a problem in the layer-generating apparatus conventionally used in 3D printing. The cements often flow poorly and tend to form agglomerates. The results are poor surfaces and component faults. In addition, the fine grain causes unpleasant dusts. The unbound powder in the build container is highly alkaline and therefore skin-unfriendly.

In addition to the hydraulic binders, so-called "micro-crystallization generators" are also known to be used as molding materials.

Examples of such include the salt-bound molding materials, whereby sands can be mixed with salts or coated with salts and the particulate material is printed with a solvent, usually an aqueous solution. During the process, the salt dissolves and forms bridges between the particles. If the mold is subsequently dried, then the water escapes and the binding solidifies.

Salt-bound molding materials have the advantage that they can be removed "wet" after casting by immersing the cast parts in a water bath. The salt dissolves, the sand loses the binding and can be rinsed out.

However, water components are bound in the salt after drying, which may be released during casting of the mold, which, in turn, can lead to the gas problems already mentioned above.

Moreover, the shape retention capability of the grains is relatively low due to the fact that the salt tends to absorb moisture from the air, which thereby softens it.

The drying after printing needs to be controlled carefully since excessive drying in turn leads to loss of binding. On the other hand, insufficient drying leads to gas problems during casting.

The salts in the sand are often aggressive to metals so that materials that come in contact with the sand need to be appropriately passivated.

The use of cement-bound, gypsum-bound and salt-bound molding material mixtures does not hold any significant meaning in serial casting, especially in automotive castings.

Moreover, it is also generally known that waterglass is used as a binder for making foundry molds.

For example, a method for producing a mold part of a casting mold for casting of molten metals is known from the prior art of EP 2 163 328 A1 for making foundry molds, which includes provision of a core or molding sand comprising a basic molding material coated with waterglass and a water content in the range of >/=approximately 0.25% to approximately 0.9% by weight in relation to the total weight of the core and the molding sand, the filling of the core or mold sand into the cavity created by the mold part, and the bringing into contact of the core or sand mold with at least one curing agent before, during and/or after the filling and hardening of the mold part.

In general, the use of waterglass in the foundry industry is known. Waterglass binders are used for mold and core production in serial casting. The curing in a cold tool can be carried out via the reaction with carbon dioxide gas ($CO_2$ gas) or the reaction with an ester. In recent years, the curing of waterglass-bonded molding material mixtures by hot tools, analogous to the organic hot box process, and the combined hardening by heated tools and gas application, usually heated air, has established itself.

Sand cores thus produced are primarily used in aluminum permanent mold casting. An example of such is EP 2 163 328 A1.

Core production using waterglass and ester or $CO_2$ gas can be classified as odor-free and therefore environmentally friendly.

The disadvantages of these methods with waterglass binders are in particular that they disintegrate poorly after casting and that the residual sand is difficult to regenerate in comparison to organically bonded sands.

The object of the invention is therefore to provide, in different aspects, a method and a material system for building models in layers which do not have the disadvantages of known methods or at least which reduce or fully overcome the disadvantages of the prior art, for example, in terms of compatibility with the environment and economical utilization in three-dimensional printing processes.

The object is achieved by the embodiments described in greater detail in the claims.

In one aspect, the invention relates to a method for building models in layers, wherein a particulate material is applied in layers in a build space and selectively hardened and these steps are repeated until a desired model is obtained.

In this case, the material includes a particulate building material which has a spray-dried alkali silicate solution. Selective activation of curing is effected by means of a water-containing solution and a drying process.

The term "build space" is generally understood to be an area in which a model is built. According to one preferred embodiment, it could be a build platform or also a build container. However, it could also be any other area otherwise. In particular, this also depends on the build process used or the device used. Conveyor belts or simply the floor would also be conceivable.

The application of the material and the selective hardening of the building material can, for example, be such that the particulate material is first applied in layers by means of a coater and then curing is selectively performed, or portions of the selective hardening are carried out, or it could also be that some or all process steps proceed at the same time.

According to the invention, the material comprises a particulate building material. Such particulate building material may thereby include any material or mixtures thereof known from the prior at for the production of models and especially of cores.

As suitable building materials, also called basic molding materials, are typical refractory materials such as quartz sand, Kerphalite, olivine sand and chrome ore sands. In addition, artificially shaped molding materials such as Cerabeads and ("min-sand") bauxite sand are also suitable. Mixtures of different molding materials are also conceivable.

The building materials should not be acidic. In addition, a particle size distribution is desired where the average grain has a diameter of about half of the desired layer thickness. As an example, for a layer thickness of about 300 μm, the median particle diameter should measure about 150 μm.

Typical layer thicknesses range from 0.1 mm to 0.5 mm.

Furthermore, according to the present invention, the material has a spray-dried alkali silicate solution. Selective activation of the curing takes place by means of a water-containing solution. Moreover, a drying process is also performed.

Alkali silicate solutions, often called waterglass, are known in the art and are glassy, water-soluble potassium silicates and sodium silicates (salts of silica) stiffened in the molten mass flow with a molar ratio $SiO_2$/alkali metal oxide of 1.5:1 to 4:1 in aqueous solutions.

Alkali metal silicates or waterglass are prepared by melting quartz sand together with sodium carbonate or potassium carbonate at 1400 to 1500° C., whereby carbon dioxide is released. The stiffened molten mass is either placed on the market in its ground state or immediately transferred into a solution of desired concentration. Sodium silicate is usually prepared by melting together silicon dioxide and sodium carbonate in the appropriate molar ratio resulting in a glassy, solidifying product that crystallizes during annealing below the melting point.

Waterglass and sodium silicate can also be produced by direct dissolution of sand in sodium hydroxide solution at elevated pressure and temperatures up to 150° C.

The alkali silicate solution may also include additional substances. It could, for example, be provided with a surfactant or other auxiliary ingredients.

According to the present invention, a spray-dried as well as still spray-dry alkali silicate solution is used. Such a solution preferably has a loss on ignition of 10-25% by weight. Spray drying or atomization drying is a process for the preparation of powders from fluids, wherein the atomized fluids are dried with a hot gas.

According to the present invention, selective curing takes place by means of a water-containing solution. As an example of such, the present invention may provide that particle material containing a spray-dry waterglass or a spray-dry alkali silicate solution is applied in layers with a coater, known from the prior art of rapid prototyping methods, to a particulate material, and then a water-containing solution is applied, for example, by means of a print head. The water thereby activates hardening of the alkali silicate solution, wherein a connection of the particulate material takes place after removal of the water, for example, by drying.

Addition of water leads to a dissolution of the powder binder. According to the present invention, a spray-dried binder is used. This has the advantage that it dissolves more rapidly than a conventionally dried binder. The liquid binder that is selectively generated in the molding sand mixture via the water-based solvent leads to adhesion between the particles of the building material. The water-based or water-containing solvent is used to begin to dissolve the alkali silicate used as a binder and to contribute to the formation of binder bridges between the individual particle grains (adhesion).

In order to activate the solid binder, it must be dissolved, and a waters containing solvent is needed to do this. The solvent best suited for this is pure water. However, water can be difficult to dispense with the single drop generators preferentially used for selectively introducing the solvent. This is due to a relatively low viscosity of about 1 mPas, which leads to a lack of uptake of the fluid column in the nozzle. In addition, the surface tension of water is relatively high so that much energy is required to produce single droplets. Not least of all, water tends to uptake gases such as air. In the sub-ambient pressures present in the drop generators, the dissolved gas escapes and absorbs the pressure surges that should be used for droplet generation. Accordingly, it is necessary to modify the water for use in the drop generators.

For example, the addition of rheological additives, thickening agents such as glycerol, glycol or sheet silicates (phyllosilicates) could be used for this purpose. The latter especially turns out to be advantageous since it is a purely inorganic material system that behaves neutrally during casting, that is, does not lead to pyrolysis.

It has been shown that 2 to 20% by weight and, more preferably, 8 to 12% by weight is an advantageous amount for the sheet silicate in the water.

The water-containing solution for selectively activating the curing can also contain other additives, such as a dye for shape recognition, a biocide and surface tension modifiers.

A drying process is necessary for curing the selectively printed material. Which drying process is deemed most suitable depends on many factors, such as the material used, the size of the component, the environmental conditions and so on.

It could be that the finished component is dried, for example, just at room temperature after construction. If this is too slow, the curing process can also be accelerated by a physical drying process that removes water at room temperature and/or increasing the temperature.

This can ail be done during and/or after the building process.

The advantage of the described method according to the invention is that the non-printed material can be reused.

The device for selective application of the curing agent should not require constant cleaning because no gluing takes place due to the fact that no self-hardening or air-hardening materials are used.

The dry material mixture is easy to apply in thin layers using known methods and a high solidity level can be achieved.

The object of the present invention is also achieved by means of a material system for building models in layers, wherein a material is applied in layers in a build space and selectively hardened and these steps are repeated until a desired model is obtained. For this purpose, the material contains a particulate build material and a spray-dried alkali silicate solution, and a water-containing solution is used for selectively activating the curing.

In one preferred embodiment of the present invention, the particulate material contains sand. If now, according to one preferred embodiment, sand is used in the particulate material as a building material, then casting cores can be advantageously produced from sand.

However, it could also be advantageous if the material includes an inorganic curing agent, especially an inorganic latent curing agent. The term "latent inorganic curing agent" describes a substance that very slowly reacts with the binder under normal conditions, i.e. room temperature and atmospheric pressure, but leads to a rapid cure when the temperature rises. According to one particularly preferred embodiment of the present invention, such a latent curing agent could be for example, amorphous silicon dioxide.

If, during a method according to the present invention, the drying process is, for example, thermally induced, then it leads to an alkali-silica reaction between the alkali silicate binder and the amorphous silicon dioxide as a latent curing agent.

If a latent curing agent, such as amorphous silicon dioxide, is added, the curing reaction can be enhanced and also be made irreversible. If heat is applied to the mixture during this process, then curing is faster and results in a higher solidity level.

According to one preferred embodiment of the present invention, the material has an auxiliary binder. This could, for example, be a hydraulically setting binder, which is a binder that requires water for binding.

Examples of such hydraulically setting binders are Portland cement, alumina cement and/or a hydraulic alumina binder.

When water is selectively introduced into the material, it may be that the water penetrates further into the material than desired, thus leading to inaccuracies in the model being built. In order to limit penetration, a hydraulic binder, preferably a cement material, can be mixed into the material. Such preferably used cement powders are very fine and have particle sizes preferably less than 30 μm. This leads to a large surface area and, therefore, also leads to a rapid and high water absorption. Excess water is then absorbed by these particles and no longer causes a loss of form. The excess water that is not needed to dissolve the binder is incorporated in the hydraulic binder, the cement. The cement thus contributes to increasing solidity and enables targeted influence upon the hardening curve.

According to the present invention, the alkali silicate solution, respectively waterglass, may be present in all conceivable forms in the material. Thus, for example, it would be possible that it is contained in particulate form in the material. The waterglass particles should be as small as possible in order to ensure high solubility.

Conventional particle diameters used for this purpose are smaller than 150 μm and more preferably less than 100 μm.

Typical examples of powdered spray-dried waterglass powders include Sikalon A from Woellener or Portil A from Cognis. They are prepared by spray drying aqueous alkali silicate solutions (sodium silicate or potassium silicate solutions). For a description of the process, please refer to Ullmann's "Encyclopedia of Industrial Chemistry" 1982, $4^{th}$ Edition, volume 21, page 412.

As a further variant it is also possible that the spray-dry alkali silicate solution is wrapped around the particulate building material, respectively the basic molding material, or that the alkali silicate solution is applied thereto. One such method is the so-called coating, wherein the coated basic molding material can be prepared by, for example, spray drying of an aqueous mixture of the basic molding material and the alkali silicate binder. The coated basic molding material is then applied in layers and printed with an aqueous solution.

Preferably in a method or material system of the present invention, the waterglass has a molar ratio $M_2O:SiO_2$ of 1.6 to 3.8, especially 1.9 to 3.4 (M=alkali metal, sodium and/or potassium).

Usually, a spray-dried alkali silicate binder or alkali silicate solution has a loss on ignition of 10-40% by weight, preferably 15-25% by weight.

According to one particularly preferred embodiment of the present invention, the latent curing agent is from the group of materials of silicic acids, which can undergo an alkali-silica reaction—these are generally synthetic silicic acids. Particularly preferred for usage are thermal or pyrogenic silicic acids, which are generated, for example, as byproducts in the production of raw silicon or ferrosilicon, microsilica, silica fume or condensed silica fume.

Advantageously, the latent curing agent is selected from the group consisting of synthetic silica, in particular thermal and/or pyrogenic silicic acids. The term "synthetic silica" used herein refers to artificial silicas such as silicas thermally prepared by flame pyrolysis, in the electric furnace or in plasma as well as precipitated silicas.

The term "synthesis" is understood to be the natural or artificial production of chemical compounds from the elements and achieved by construction from simpler compounds or by degradation of more complex structures. Such "synthesis" is possibly multi-stage and primarily targeted in nature.

According to the present invention, a reaction could, for example, occur in such a manner. Spray-dried binder is activated by addition of water, then reacts with a preferable added latent curing agent, for example, amorphous silicon dioxide. The curing reaction that takes place here, an alkali-silica reaction, is accelerated by supplying energy, especially heat, which leads to faster curing of the resulting model and a higher solidity than the model would obtain without the addition of a latent curing agent.

The storage stability of cores during high humidity as well as the thermal stability, e.g. the deflection of cores, during the casting process also increases significantly compared to cores manufactured using only alkali silicate binder as a binder.

According to one particularly preferred embodiment of the present invention, the alkali silicate content, i.e. the binder content added to the material, especially the particulate material, such as sand, which is present in solid form prior to the partial dissolution with the printing solution, is 2-18%, preferably 3-10% by weight.

Advantageously, the proportion of the latent curing agent present in relation to the binder in solid form is 5-90% by weight.

If, according to one preferred embodiment, the material also possesses refractory materials and/or fillers, then the properties of the created model, e.g. the casting core, may be optimized.

Such refractory materials and/or fillers are also used for mold coatings, e.g. graphite, alumina, zirconium silicate, to improve the cast quality. Further additives to the sand may include water-soluble binder, phosphates or carbohydrates, such as dextrin.

According to one preferred embodiment of the present invention, the material includes a mixture of spray-dried alkali silicate binder, sand and amorphous silicon dioxide in a % by weight ratio of 1.5-15:80-98:0.2-8.

Advantageously, the solution contains a sheet silicate preferably 5-15% weight by weight, to activate the selective hardening.

Preferably, the solution for activation of selective hardening is applied with an ink jet print head, preferably using piezo technology.

To accelerate the hardening in the process, it may also be advantageous to provide additional heat.

This can be done by e.g. convection and/or thermal radiation.

The solid bodies thus produced preferably have a three-point bending strength of greater than or equal to approximately 200 $N/cm^2$.

The invention is illustrated in preferred embodiments in the following examples.

EXAMPLE

A material system suitable for use in a three-dimensional printing process is provided, for example, as described in the following.

The following are intensively mixed so that the mixture is completely homogeneous: 90% by weight of silica sand of the type GS 14 RP with a mean grain diameter of 0.13 mm (from Strobel) with 6% by weight of waterglass powder (such as molar module 2.10, Portil A from Cognis), 2% by weight of synthetic silicon dioxide from the electric arc furnace (microsilica 971 U from Elkem) as latent curing agent as well as 2% by weight alumina cement (CA 14 S from Almatis) as hydraulic binder.

This dry molding material mixture is applied layer by layer in a build space. Following this, the waterglass binder is activated by water that is selectively printed using a known ink jet printing technology and with a print head that is normally used for a three-dimensional printing process. The binder dissolves on the printed areas and the surrounding particles are glued together.

In order to produce a desired model, selective printing preferably occurs according to computer data.

During this process, either the entirety or portions of the particulate material may be heated prior to selective printing. In doing so, the drying process for curing can proceed faster.

A layer of molding material mixture is now once again applied and then in turn selectively printed according to computer data.

This is repeated until the desired model is built. The result is the desired body, which must then be freed from the surrounding sand after the layer-building process.

In order to increase the solidity and simultaneously smooth the surface of the finished components, they can be sprayed with a waterglass solution or a waterglass-water mixture and then dried in the oven.

The mixed unprinted sand can be reintroduced into the process. To do this, the sand must be removed from the models or mold parts and screened to avoid coarse impurities. Advantageously, the recycled molding material is mixed with fresh material prior to reuse in order to achieve consistent quality. The addition of new sand should preferably range between 10% and 50% by weight.

It has been found that a good bonding effect can be obtained when 2 and 12% by weight of binder mixture (mixture of spray-dried waterglass and amorphous silicon dioxide) is mixed in the sand.

Advantageously, the admixture ranges between 3% and 6%. The achievable solidities when using the quartz sand type GS14 (MK: 0.13 mm/AFS number 97) are around 280 $N/cm^2$. Between 3% and 18% by weight of aqueous solution is to be dosed into the molding material to achieve sufficient activation of the binder. Advantageously, the quantity to be dispensed ranges between 5% and 10%.

An accelerated solidification reaction can be provided to prevent water from unintentionally penetrating into non-printed border zones, thereby resulting in a hardening reaction there, which in turn would lead to deterioration of image fidelity and resolution.

This is achieved, for example, by the supply of heat. An increase in the sand temperature from 20° C. to 60° C. accelerates the hardening process duration from several hours to just a few hours. If further increased to 90° C., the solidification can even occur in a few minutes. Due to the input of heat, the curing reaction of the binder with the latent curing agent, the amorphous silicon dioxide, is significantly accelerated. However, attention must be paid that processed layers do not harden separately, otherwise the layer bonding is not performed. That means that the setting time should preferably not be less than 10 minutes, depending on the build space size and processing speed.

What is claimed is:

1. A method for building models in layers, wherein a particulate material is applied in layers in a build space and selectively hardened and these steps are repeated until a desired model is obtained, the particulate material comprises a particulate building material, characterized in that the particulate material comprises a spray-dried alkali silicate solution, the method includes a step of curing that is selectively activated by a solution containing water, and that a drying process is involved;
    wherein the particulate material includes an inorganic curing agent; and
    the inorganic curing agent is a latent curing agent, a synthetic silica, or a pyrogenic silicic acid.

2. The method of claim 1, wherein the particulate building material includes sand.

3. The method of claim 2, wherein the particulate material includes an auxiliary binder.

4. The method of claim 3, wherein the auxiliary binder is a hydraulically setting binder including Portland cement, alumina cement and/or a hydraulic binder containing alumina.

5. The method of claim 1, wherein the particulate material includes particles of the spray-dried alkali silicate solution.

6. The method of claim 1, wherein the spray-dried alkali silicate solution is applied as a coating on the particulate building material.

7. The method of claim 1, wherein the alkali silicate has a molar ratio $M_2O:SiO_2$ of 1.6 to 3.8, wherein M is sodium, potassium, or both.

8. The method of claim 1, wherein the particulate material contains a spray-dried alkali silicate fraction amounting to 2-18% by weight.

9. The method of claim 1, wherein the inorganic curing agent is a latent curing agent and the proportion of the latent curing agent amounts to 5-90% by weight in relation to the solid binder.

10. The method of claim 1, wherein the particulate material additionally includes refractory materials and/or fillers.

11. The method of claim 1, wherein the solution for the selective hardening is applied with an ink jet print head.

12. The method of claim 1, wherein the curing is accelerated by heat.

13. A solid body manufactured by a method claim 1, characterized in that the solid body has a bending strength of greater than or equal to 220 N/cm².

14. The method of claim 1,
    wherein
    the particulate building material includes sand;
    the latent inorganic curing agent includes an amorphous silicon dioxide;
    the particulate material includes a hydraulically setting binder including a Portland cement, an alumina cement, or a hydraulic binder containing alumina;
    the alkali silicate has a molar ratio $M_2O:SiO_2$ of 1.9 to 3.4, where M is sodium, potassium, or both;
    the spray-dried alkali silicate is present in an amount of 3-10% by weight;
    the particulate material includes a mixture of the spray-dried alkali silicate binder, the sand, and the amorphous silicon dioxide in a % by weight ratio of 1.5-15:80-98:0.2-8;
    the solution contains 5-15 percent by weight of a sheet silicate to activate the selective hardening;
    the solution for the selective hardening is applied with an ink jet print head using piezo technology; and
    the curing is accelerated by heat.

15. A material system for building models in layers, wherein a particulate material is applied in layers in a build space and selectively hardened and these steps are repeated until a desired model is obtained, the material system comprises a particulate building material, characterized in that the material system further comprises a spray-dried alkali silicate solution, and that a polar solvent is used for selectively activating the hardening;
    wherein the material system includes an inorganic curing agent; and
    the inorganic curing agent is a latent curing agent, a synthetic silica, or a pyrogenic silicic acid.

16. A method for building models in layers, wherein a particulate material is applied in layers in a build space and selectively hardened and these steps are repeated until a desired model is obtained, the particulate material comprises a particulate building material, characterized in that the particulate material comprises a spray-dried alkali silicate solution, curing that is selectively activated by a solution containing water, and that a drying process is involved;
    wherein the solution contains a sheet silicate.

17. A method for building models in layers, comprising the steps of:
    applying a particulate material in layers in a build space, and selectively hardening the particulate material; wherein these steps are repeated until a desired model is obtained, wherein the particulate material comprises:
        a particulate building material including a mixture of:
            i) a spray-dried alkali silicate binder particles;
            ii) a sand particles, and
            iii) an amorphous silicon dioxide particles; and
        the method includes a step of curing that is selectively activated by a solution containing water, and wherein a drying process is involved.

18. The method of claim 17, wherein the spray-dried alkali silicate binder, the sand, and the amorphous silicon dioxide are present in the mixture in a % by weight ratio of 1.5-15:80-98:0.2-8.

19. A material system for building models in layers, wherein a particulate material is applied in layers in a build space and selectively hardened and these steps are repeated until a desired model is obtained, wherein the material system comprises:
    a particulate building material including a mixture of:
        i) a spray-dried alkali silicate binder particles
        ii) a sand particles, and
        iii) an amorphous silicon dioxide particles; and
    a polar solvent for selectively activating the hardening.

20. The material system of claim 19,
    wherein
    the particulate building material includes sand;
    the particulate material includes a latent inorganic curing agent including an amorphous silicon dioxide;

the particulate material includes a hydraulically setting binder including a Portland cement, an alumina cement, or a hydraulic binder containing alumina;

the alkali silicate has a molar ratio $M_2O:SiO_2$ of 1.9 to 3.4, where M is sodium, potassium, or both;

the spray-dried alkali silicate is present in an amount of 3-10% by weight;

the material system includes a mixture of the spray-dried alkali silicate binder, the sand, and the amorphous silicon dioxide in a % by weight ratio of 1.5-15:80-98:0.2-8;

the solution contains 5-15 percent by weight of a sheet silicate to activate the selective hardening;

the material system includes a solution for the selective hardening including the polar solvent, wherein the solution is capable of being applied with an ink jet print head using piezo technology; and the curing is accelerated by heat.

* * * * *